US011945688B2

(12) United States Patent
Watanabe

(10) Patent No.: US 11,945,688 B2
(45) Date of Patent: Apr. 2, 2024

(54) ELEVATOR CONTROL DEVICE, ELEVATOR MONITORING SYSTEM, AND ELEVATOR MONITORING METHOD WITH ENCRYPTED REMOTE MONITORING

(71) Applicant: Mitsubishi Electric Building Solutions Corporation, Tokyo (JP)

(72) Inventor: Akihiko Watanabe, Tokyo (JP)

(73) Assignee: MITSUBISHI ELECTRIC BUILDING SOLUTIONS CORPORATION, Tokyo (JP)

( * ) Notice: Subject to any disclaimer, the term of this patent is extended or adjusted under 35 U.S.C. 154(b) by 0 days.

(21) Appl. No.: 18/010,214

(22) PCT Filed: Jun. 19, 2020

(86) PCT No.: PCT/JP2020/024222

§ 371 (c)(1),
(2) Date: Dec. 14, 2022

(87) PCT Pub. No.: WO2021/255932

PCT Pub. Date: Dec. 23, 2021

(65) Prior Publication Data

US 2023/0192443 A1 Jun. 22, 2023

(51) Int. Cl.
*B66B 5/00* (2006.01)

(52) U.S. Cl.
CPC .................................. *B66B 5/0018* (2013.01)

(58) Field of Classification Search
CPC ....... B66B 1/3407–3423; B66B 1/3446–3461; B66B 5/0006; B66B 5/0018; B66B 5/0025; B66B 5/0037
See application file for complete search history.

(56) References Cited

U.S. PATENT DOCUMENTS 9,944,497 B2 * 4/2018 Matheisl ............... B66B 29/005
11,671,251 B1 * 6/2023 Copparapu ........... H04L 9/0618 380/44

(Continued)

FOREIGN PATENT DOCUMENTS

CN 205087727 U 3/2016
CN 106315327 A 1/2017

(Continued)

OTHER PUBLICATIONS

Written Opinion of the International Searching Authority dated Sep. 8, 2020, received for PCT Application PCT/JP2020/024222, filed on Jun. 19, 2020, 4 pages. (Previously filed; submitting English translation only.).

(Continued)

*Primary Examiner* — Christopher Uhlir
(74) *Attorney, Agent, or Firm* — XSENSUS LLP

(57) ABSTRACT

Proper use of a remote monitoring function is realized in an elevator-control-device that monitors an elevator. An elevator-control-device is connected with a remote-monitoring-server that remotely monitors an elevator, via a communication network. The elevator-control-device includes a processor that performs a monitoring-control-process for monitoring the elevator, and a memory. The memory stores a communication function in which a control program for communicating with the remote-monitoring-server for the elevator is stored, a remote-monitoring-function in which a control program for the monitoring-control-process is stored, and a maintenance terminal function in which a control program for connection with a maintenance terminal is stored. The remote-monitoring-function is encrypted and is stored in the memory. In a case where the encrypted remote-monitoring-function is executed, the processor receives a decryption key of the remote-monitoring-function from the remote-monitoring-server by using the communi- (Continued)

cation function, decrypts the remote-monitoring-function by using the decryption key, and executes the monitoring-control-process.

10 Claims, 8 Drawing Sheets

(56) References Cited

U.S. PATENT DOCUMENTS

| | | | |
|---|---|---|---|
| 2011/0247901 A1 | 10/2011 | Wilke et al. | |
| 2019/0210837 A1 | 7/2019 | Herkel et al. | |
| 2020/0283266 A1 | 9/2020 | Sonnenmoser et al. | |
| 2022/0407848 A1 * | 12/2022 | Colombano | H04L 63/083 |

FOREIGN PATENT DOCUMENTS

| | | | |
|---|---|---|---|
| DE | 10 2018 211 776 | A1 | 1/2020 |
| EP | 3 392 191 | A1 | 10/2018 |
| EP | 3 626 664 | A1 | 3/2020 |
| JP | 2005-035759 | A | 2/2005 |
| JP | 2006-163508 | A | 6/2006 |
| JP | 2007-039166 | A | 2/2007 |
| JP | 2008-273732 | A | 11/2008 |
| JP | 2010-150016 | A | 7/2010 |
| JP | 2010-228907 | A | 10/2010 |
| JP | 2016-216151 | A | 12/2016 |
| WO | 2005/113400 | A1 | 12/2005 |
| WO | 2018/134110 | A1 | 7/2018 |
| WO | 2019/081332 | A1 | 5/2019 |

OTHER PUBLICATIONS

International Search Report and Written Opinion dated Sep. 8, 2020, received for PCT Application PCT/ JP2020/024222, filed on Jun. 19, 2020, 12 pages including English Translation.

Chinese Office Action dated Apr. 8, 2023 in corresponding Chinese Patent Application No. 202080102109.X (with 1 machine-generated English translation), 14 pages.

Office Action issued on Sep. 7, 2023, in corresponding Chinese patent Application No. 202080102109.X,.

Wikipedia, Die freie Enzyklopädie. Verschlüsselung, Mar. 6, 2020 [abgerufen am 30.05.2023], URL: https://de.wikipedia.org/w/index.php?title=Verschl%C3%BCsselung&oldid=200591725, 18pp.

Wikipedia, Die freie Enzyklopädie. Symmetrisches_Kryptosystem, Feb. 27, 2020 [abgerufen am May 30, 2023], URL: https://de.wikipedia.org/wiki/Symmetrisches_Kryptosystem, 4pp.

Wikipedia, Die freie Enzyklopädie. Asymmetrisches_Kryptosystem, Nov. 2, 2020 [abgerufen am May 30, 2023], URL: https://de.wikipedia.org/w/index.php?title=Asymmetrisches_Kryptosystem&oldid=196734967, 12pp.

Wikipedia, Die freie Enzyklopädie. One-Time-Pad, May 23, 2020 [abgerufen am May 30, 2023], URL: https://de.wikipedia.org/w/index.php?title=One-Time-Pad&oldid=200228686, 22pp.

Office Action dated May 31, 2023 in the corresponding German patent application No. 112020007335.1, 30pp.

Singaporean Office Action issued Sep. 1, 2023 in the corresponding Singaporean patent application No. 11202253507Q.

* cited by examiner

ELEVATOR CONTROL DEVICE, ELEVATOR MONITORING SYSTEM, AND ELEVATOR MONITORING METHOD WITH ENCRYPTED REMOTE MONITORING

CROSS-REFERENCE TO RELATED APPLICATION

The present application is based on PCT filing PCT/JP2020/024222, filed Jun. 19, 2020, the entire contents of which are incorporated herein by reference.

FIELD

The present disclosure relates to an elevator control device, an elevator monitoring system, and an elevator monitoring method.

BACKGROUND

An elevator control device may store a control program about a remote monitoring function for performing monitoring and diagnosis of an elevator based on a maintenance contract. PTL 1 discloses a technique for deleting a control program in a case where a maintenance contract period ends in order to realize proper use of a remote monitoring function. In this technique, in order to prevent erroneous erasure of the control program during the maintenance contract period, in a case where an elapsed time after communication connection with a remote monitoring server is established at the last time during the maintenance contract period becomes a first time threshold value or more and an elapsed time after a worker performs maintenance work for an elevator device at the last time becomes a second threshold value or more, the control program used for the maintenance work is deleted.

CITATION LIST

Patent Literature

[PTL 1] JP 2016-216151 A

SUMMARY

Technical Problem

Depending on a district where an elevator device is installed, there may be problems with stability of a communication network and a maintenance system in emergency. In such a district, it is possible that communication between the elevator device and a remote monitoring server is unintentionally disconnected. The above technique has a problem that an erasing condition of a control program of a remote monitoring function is satisfied in such a case and usability is inadequate.

The present disclosure has been made to solve the above-described problems, and an object thereof is to provide an elevator control device, an elevator monitoring system, and an elevator monitoring method that are capable of realizing proper use of a remote monitoring function in an elevator control device that monitors an elevator.

Solution to Problem

The present disclosure is applied to an elevator control device being connected with a remote monitoring server that remotely monitors an elevator, via a communication network. The elevator control device includes a processor that performs a monitoring control process for monitoring the elevator, and a memory that stores a communication function in which a control program for communicating with the remote monitoring server for the elevator is stored, a remote monitoring function in which a control program for the monitoring control process is stored, and a maintenance terminal function in which a control program for connection with a maintenance terminal is stored. The remote monitoring function is encrypted and is stored in the memory. The processor is configured to receive a decryption key of the remote monitoring function from the remote monitoring server by using the communication function, decrypt the remote monitoring function by using the decryption key, and execute the monitoring control process.

Further, the present disclosure is applied to an elevator monitoring system including a remote monitoring server that remotely monitors an elevator, and an elevator control device that is connected with the remote monitoring server via a communication network. The elevator control device includes a processor that performs a monitoring control process for the elevator and a memory that stores a communication function in which a control program for communicating with the remote monitoring server for the elevator is stored, a remote monitoring function in which a control program for the monitoring control process is stored, and a maintenance terminal function in which a control program for connection with a maintenance terminal is stored. The remote monitoring function is encrypted and is stored in the memory. The remote monitoring server is configured to transmit a decryption key of the remote monitoring function to the elevator control device in response to a request for the decryption key transmitted from the elevator control device. The processor is configured to receive the decryption key from the remote monitoring server by using the communication function, decrypt the remote monitoring function by using the decryption key, and execute the monitoring control process.

Further, the present disclosure is applied to an elevator monitoring method using an elevator monitoring system including a remote monitoring server that remotely monitors an elevator, and an elevator control device that is connected with the remote monitoring server via a communication network. The elevator control device is configured to store a communication function in which a control program for communicating with the remote monitoring server for the elevator is stored, a remote monitoring function in which a control program for performing the monitoring control process for the elevator is stored, and a maintenance terminal function in which a control program for connection with a maintenance terminal is stored. The remote monitoring function is encrypted and stored. In a case where the elevator control device executes the monitoring control process by using the encrypted remote monitoring function, in the elevator monitoring method, the elevator control device requests a decryption key of the remote monitoring function from the remote monitoring server, the remote monitoring server generates the decryption key, the elevator control device receives the decryption key transmitted from the remote monitoring server, the elevator control device decrypts the remote monitoring function by using the decryption key, and the elevator control device executes the monitoring control process.

Advantageous Effects of Invention

In an elevator control device of the present disclosure, a remote monitoring function is encrypted. A decryption key for decryption is received from a remote monitoring server. As described above, in the elevator device of the present disclosure, the remote monitoring function for the elevator device can be decrypted by using the decryption key received from the remote monitoring server. Accordingly, it becomes possible to realize proper use of the remote monitoring function.

DESCRIPTION OF EMBODIMENTS

Figure 1:
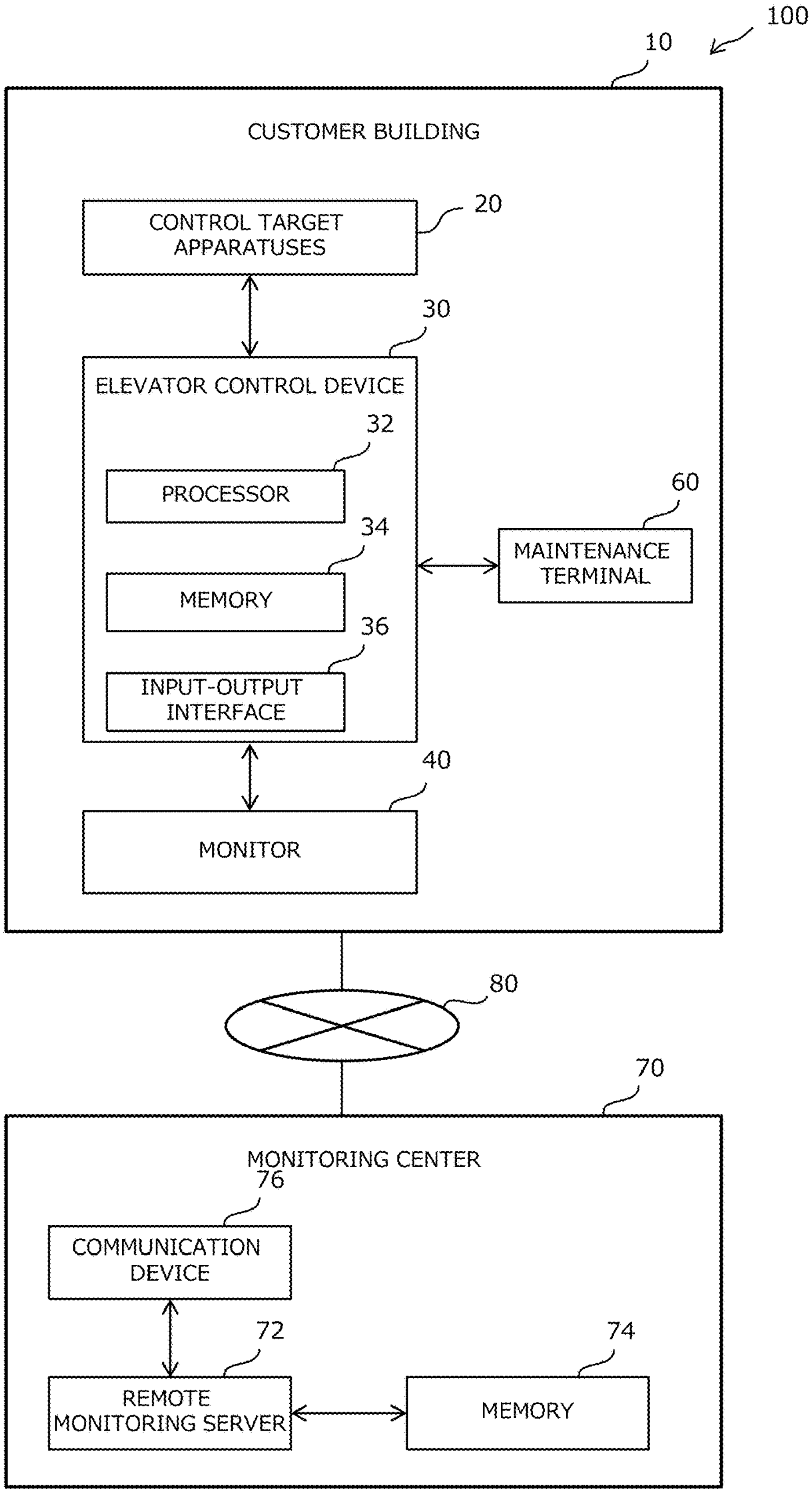
FIG. 1 is a diagram illustrating an example of an elevator monitoring system of a first embodiment.

Embodiments will hereinafter be described with reference to drawings. Note that the same reference characters are given to elements common to figures, and a description thereof will not be repeated.

1. First Embodiment

1-1. Configuration of Elevator Monitoring System

FIG. 1 is a diagram illustrating an example of an elevator monitoring system of a first embodiment. An elevator monitoring system 100 is a system for remotely monitoring motions of elevators that are individually provided to one or plural customer buildings 10 from a monitoring center 70. In the customer building 10, an elevator control device 30 and a monitor 40 for controlling a control target apparatus 20 of the elevator are installed. The elevator control device 30 and the monitor 40 are connected with the monitoring center 70 via a communication network 80. The communication network 80 can use a telephone line, an IP (Internet protocol), and so forth. Locations and the number of customer buildings 10 are not limited. For example, the customer building 10 connected with the monitoring center 70 may be installed in a second country that is different from a first country where the monitoring center 70 is installed.

The control target apparatus 20 is an apparatus to be controlled by the elevator control device 30. The control target apparatuses 20 include a traction machine that drives a car of the elevator, an open-and-close device that opens and closes a door of a car, and so forth, for example. The elevator control device 30 controls the control target apparatuses 20 of the elevator. The elevator control device 30 includes a processor 32, a memory 34, and an input-output interface 36.

A processor 32 executes various kinds of processes. The processor 32 is a microcomputer, for example. The memory 34 stores various kinds of information. As the memory 34, a volatile memory, a non-volatile memory, and so forth are illustrated as examples. The processor 32 executes a control program as a computer program, and various kinds of processes by the processor 32 are thereby executed. The control program is stored in the memory 34 or recorded in a computer-readable recording medium.

The processor 32 executes an operation control process for controlling operations of the control target apparatuses 20 of the elevator. Specifically, the processor 32 controls a motion of the traction machine, the open-and-close motion of the door of the car, and so forth.

Further, the processor 32 executes a monitoring control process for obtaining monitoring data that indicate an operation state of the elevator. The monitoring data are motion data or call data of the control target apparatus 20 of the elevator, for example. The motion data include a running state, an open-and-close state of the door, a car load, or a car position, for example. The call data include data of a call registration of the elevator, allocation of a call, or a response to a call, for example. The obtained monitoring data are stored in the memory 34.

Figure 2:
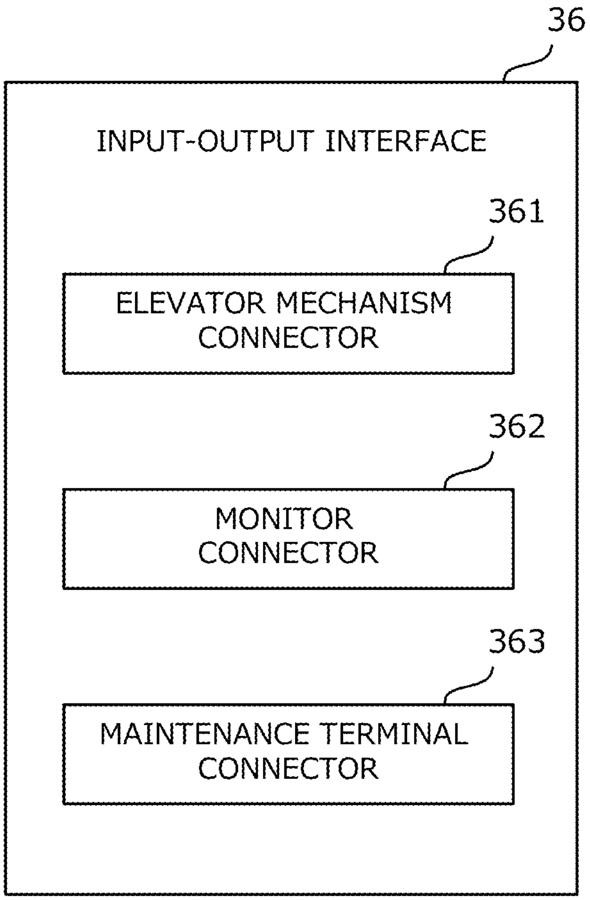
FIG. 2 is a block diagram illustrating a function of an input-output interface.

FIG. 2 is a block diagram illustrating a function of the input-output interface. As illustrated in FIG. 2, the input-output interface 36 includes, as input-output ports for external apparatuses, an elevator mechanism connector 361, a monitor connector 362, and a maintenance terminal connector 363. The elevator mechanism connector 361 is connected with the control target apparatus 20 of the elevator, transmits an instruction value for the operation control process of the control target apparatus 20, and receives the monitoring data for the monitoring control process. The maintenance terminal connector 363 is a port for connecting a maintenance terminal 60 for maintenance and management, which is possessed by a worker. The monitor connector 362 is a port with which the monitor 40 is connected.

The monitor 40 is connected with the elevator control device 30 to be capable of communicating with that and is connected with the monitoring center 70 to be capable of communicating with that via the communication network 80. Further, the monitor 40 receives the monitoring data transmitted from the elevator control device 30. Further, the monitor 40 receives various kinds of data necessary for monitoring of the elevator such as image data by a monitoring camera installed in the elevator. The monitor 40 comprehensively monitors a state of the elevator based on the received data and periodically transmits a monitoring result as monitoring information to the monitoring center 70.

Further, the monitor 40 periodically transmits a health check request to the monitoring center 70. Here, a health check means an examination about whether or not the monitor 40 normally operates. In a case where a health check response is received from the monitoring center 70, the monitor 40 transmits the received health check response to the elevator control device 30. Further, in a case where an encryption key and a decryption key, which will be described later, are received from the monitoring center 70, the monitor 40 transmits the received encryption key and decryption key to the elevator control device 30.

The monitoring center 70 remotely monitors elevators installed in one or plural customer buildings 10 based on an elevator maintenance contract with a customer. The monitoring center 70 includes a remote monitoring server 72, a memory 74, and a communication device 76. The remote monitoring server 72 generates the health check response in response to the health check request transmitted from the monitor 40. Further, the remote monitoring server 72 generates the decryption key and the encryption key in response to a decryption key request that is transmitted from the monitor 40 and will be described later.

The memory 74 stores various kinds of data received from the monitor 40. Further, the memory 74 stores the health check response, the decryption key, and the encryption key that are generated in the remote monitoring server 72.

The communication device 76 includes a function of transmitting and receiving data. The communication device 76 communicates with the monitor 40 via the communication network 80.

Figure 3:
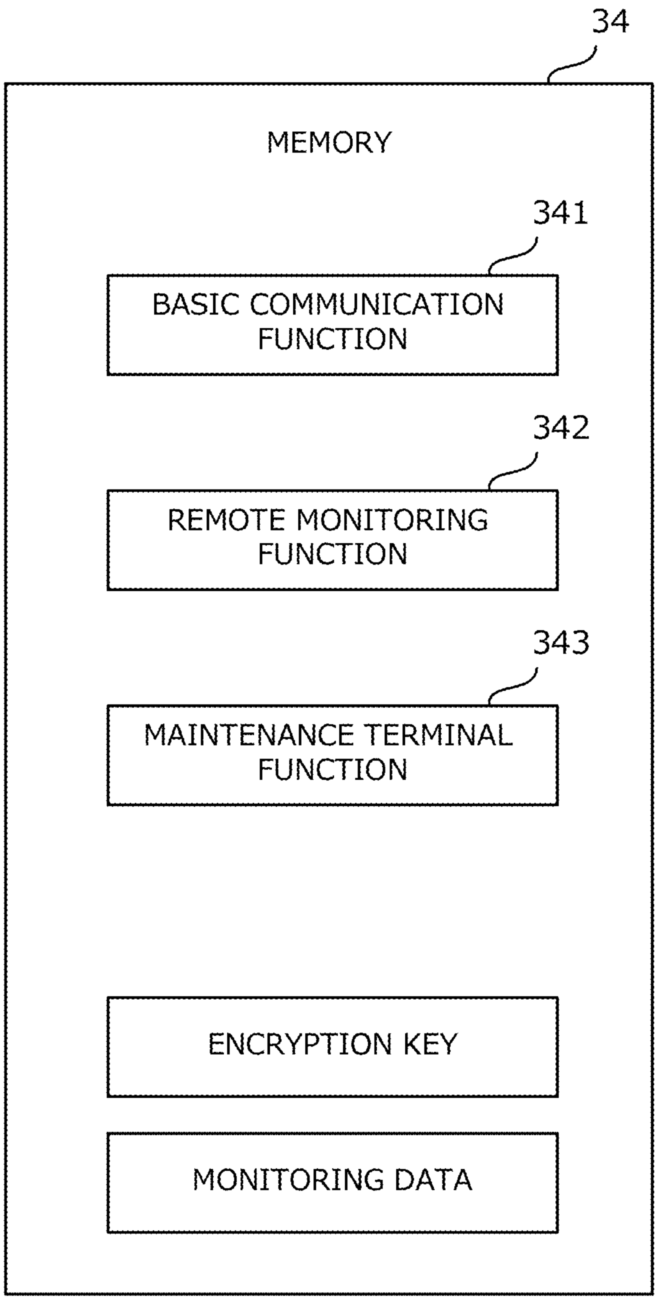
FIG. 3 is a block diagram illustrating an example of a memory of the elevator control device.

FIG. 3 is a block diagram illustrating an example of the memory 34 of the elevator control device 30. The memory 34 stores, as the control programs, a basic communication function 341, a remote monitoring function 342, and a maintenance terminal function 343. Further, the memory 34 appropriately stores the encryption key and the above-described monitoring data.

The basic communication function 341 includes a control program for communicating with the monitoring center 70 via the monitor 40. The basic communication function 341 is not encrypted. Thus, the basic communication function 341 can always be used. The processor 32 of the elevator control device 30 executes the control program of the basic communication function 341 stored in the memory 34. Accordingly, communication between the monitor 40 and the monitoring center 70 is performed.

The remote monitoring function 342 includes a control program for the monitoring control process for performing monitoring and diagnosis of the elevator. The remote monitoring function 342 is encrypted for ensuring proper use based on the maintenance contract. Thus, the processor 32 of the elevator control device 30 obtains the decryption key in a decryption process described later and decrypts the remote monitoring function 342. Then, the processor 32 of the elevator control device 30 executes the control program of the remote monitoring function 342 and thereby executes the monitoring control process.

The maintenance terminal function 343 includes a control program for transmitting data to and receiving data from the maintenance terminal 60. The maintenance terminal function 343 is not encrypted. Thus, the maintenance terminal function 343 can basically always be used during connection of the maintenance terminal 60. The processor 32 of the elevator control device 30 executes the control program of the maintenance terminal function 343 and thereby performs transmission and reception of data between the processor 32 and the maintenance terminal 60.

The encryption key is for again encrypting the decrypted remote monitoring function 342. The encryption key is generated in the remote monitoring server 72 of the monitoring center 70 and is transmitted, together with the decryption key, to the elevator control device 30. The received encryption key is stored in the memory 34 and is read out in an encryption process described later.

1-2. Action of Elevator Monitoring System

Next, a description will be made about an elevator monitoring method using the elevator monitoring system 100. As described above, the remote monitoring function 342 is in advance encrypted. Accordingly, in a case where the monitor 40 is properly connected with the elevator control device 30 based on the maintenance contract, the elevator monitoring system 100 executes the decryption process for decrypting the remote monitoring function 342 by using the decryption key. Further, in order to prevent use of the decrypted remote monitoring function 342 for unintended purposes, in a case where an encrypting condition defined in advance is satisfied, the elevator monitoring system 100 executes the encryption process for again encrypting the remote monitoring function 342.

Figure 4:
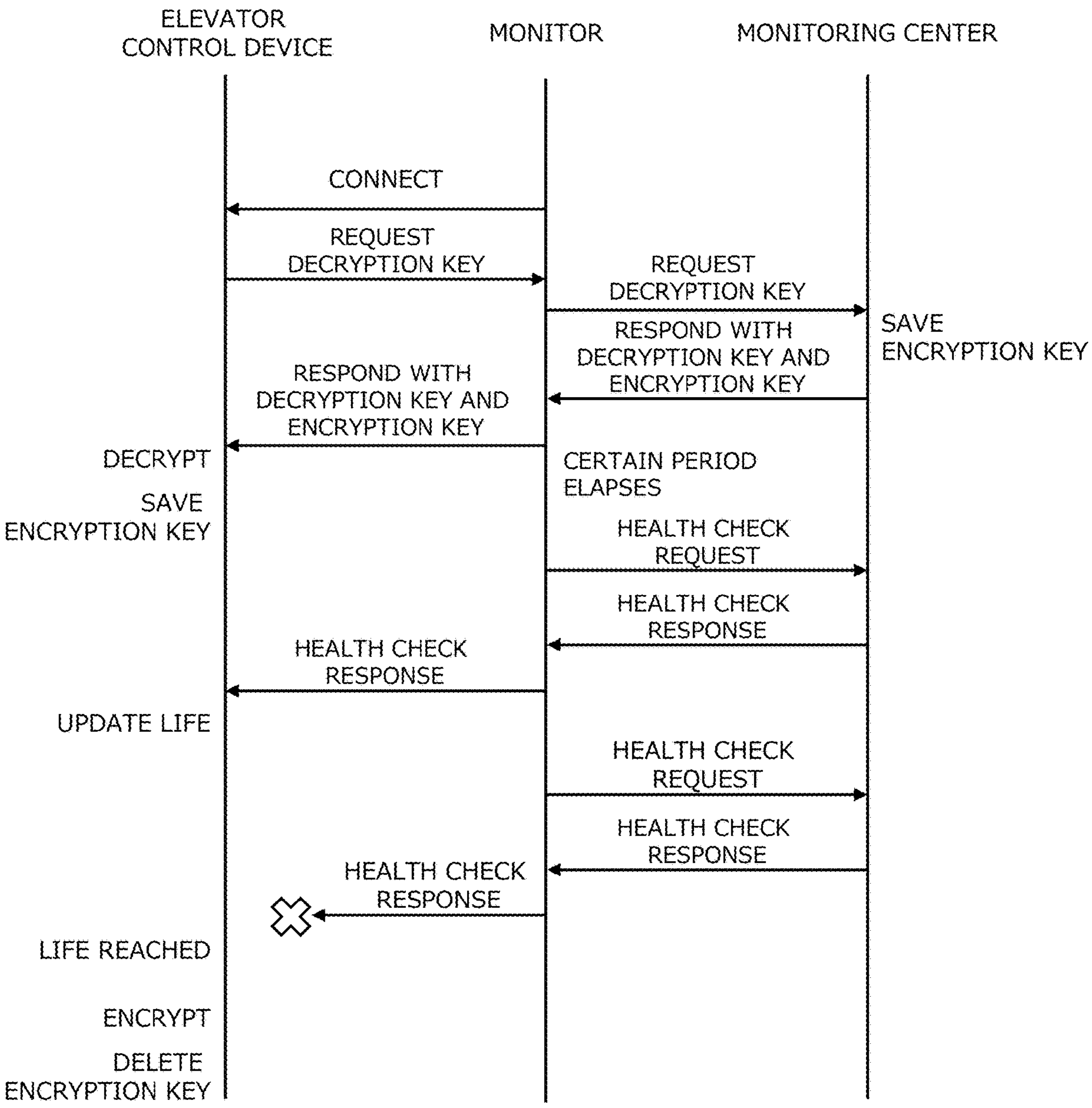
FIG. 4 is an action sequence diagram illustrating actions of a decryption process and an encryption process of the elevator monitoring system.
Figure 5:
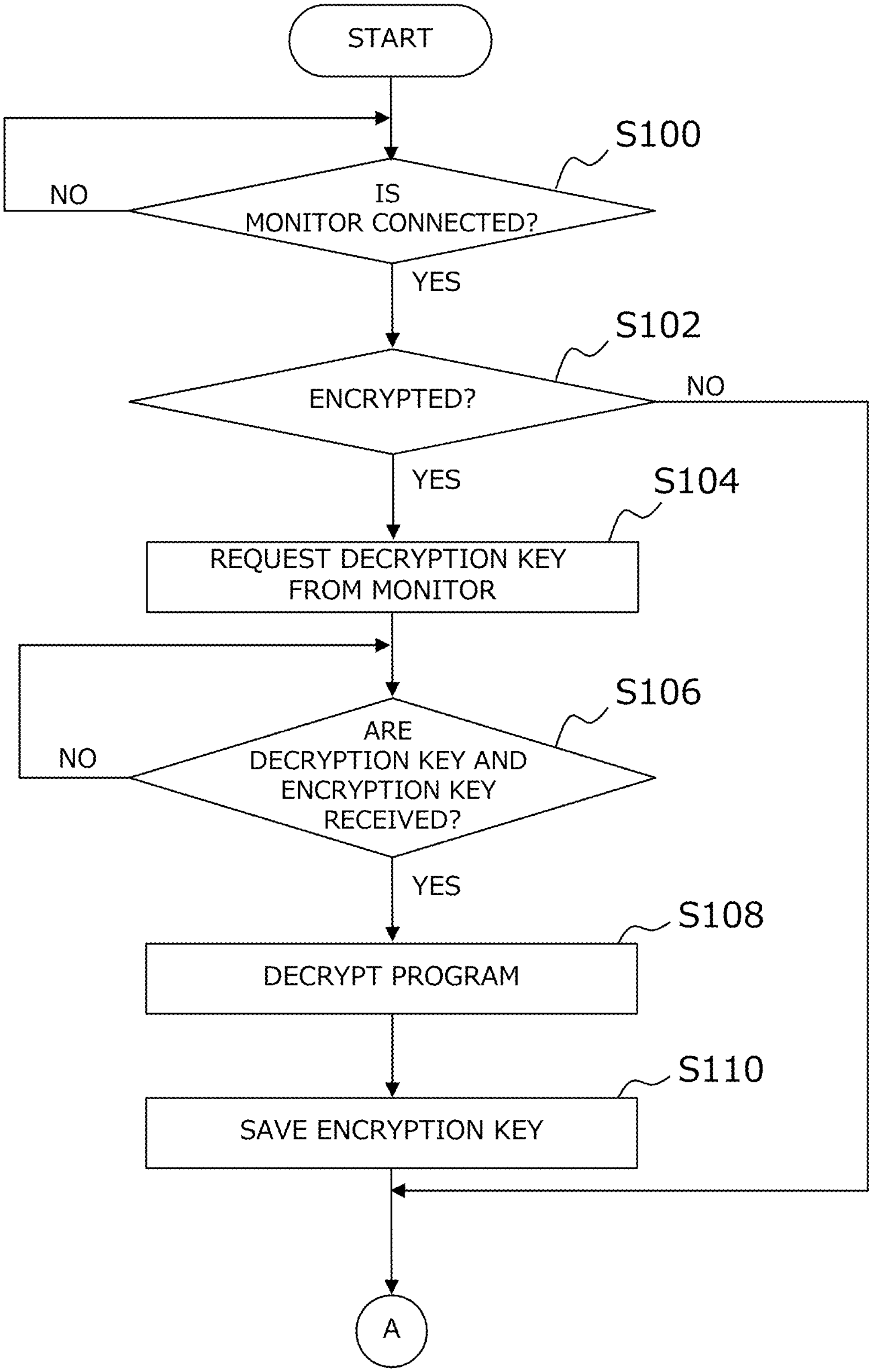
FIG. 5 is a flowchart illustrating a control routine in which the elevator monitoring system executes the decryption process and the encryption process.
Figure 6:
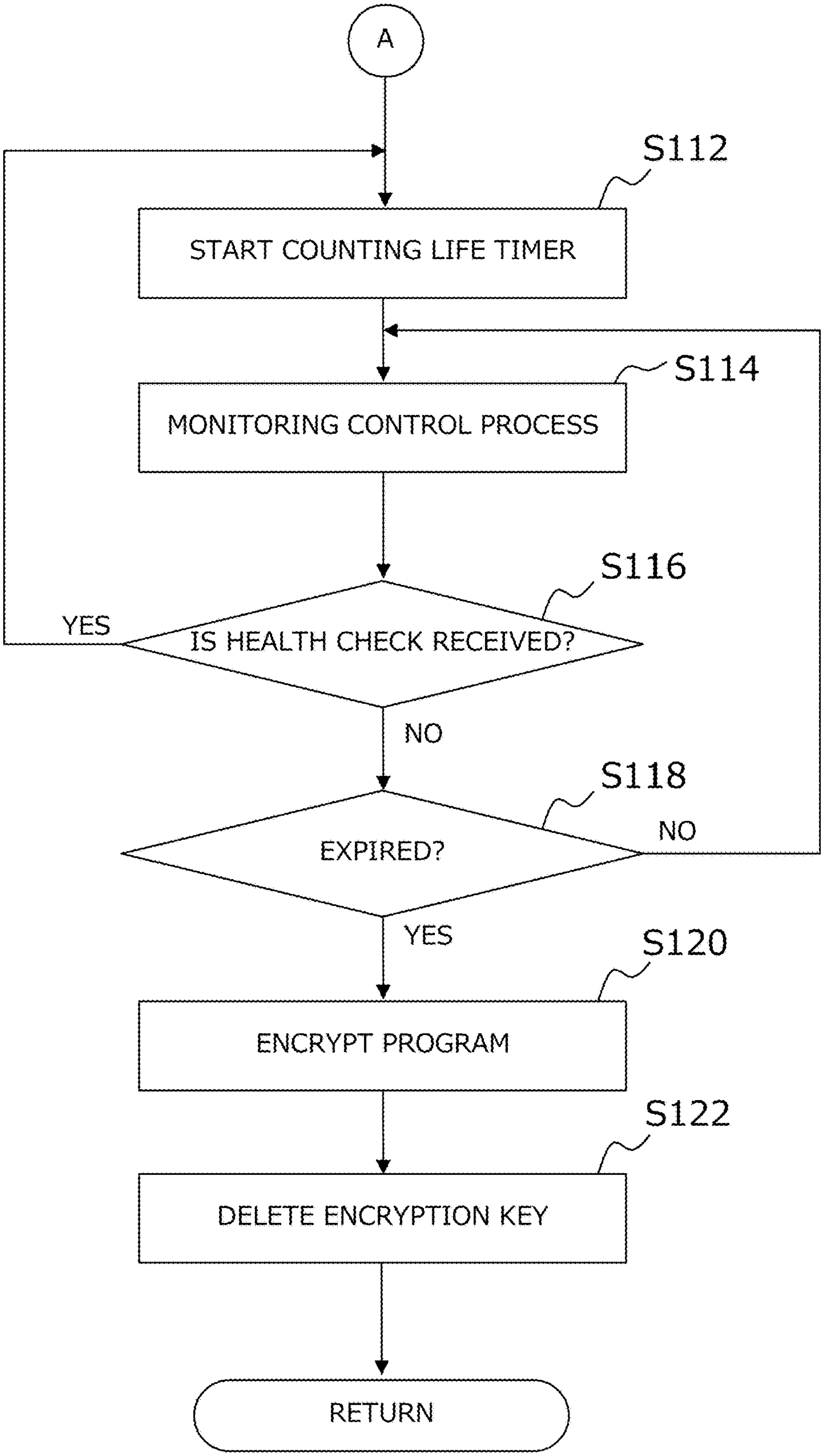
FIG. 6 is a flowchart illustrating a control routine in which the elevator monitoring system executes the decryption process and the encryption process.

FIG. 4 is an action sequence diagram illustrating actions of the decryption process and the encryption process of the elevator monitoring system. Further, FIG. 5 and FIG. 6 are flowcharts illustrating a control routine in which the elevator monitoring system executes the decryption process and the encryption process. In the following, referring also to FIG. 4, a description will be made about specific processing of the control routine illustrated in FIG. 5 and FIG. 6.

In step S100 of the control routine illustrated in FIG. 5, the elevator control device 30 first judges whether or not the monitor 40 is connected. As a result, in a case where the monitor 40 is not connected with the elevator control device 30, a process in step S100 is repeatedly executed until a positive judgment is made. In step S100, when the positive judgment is recognized, the processing moves to next step S102.

In step S102, the elevator control device 30 judges whether or not the remote monitoring function 342 is encrypted. As a result, in a case where the remote monitoring function 342 is not encrypted, it is determined that the decryption process is not necessary, and the processing moves to step S112 of the control routine illustrated in FIG. 6. On the other hand, in a case where the remote monitoring function 342 is encrypted, the processing moves to the decryption process indicated by step S104 to step S110.

In step S104, the elevator control device 30 first requests, from the monitor 40, the decryption key for decrypting the remote monitoring function 342. The monitor 40 accepting an instruction requests the decryption key from the monitoring center 70. The monitoring center 70 confirms that the received decryption key request is an appropriate request based on the maintenance contract, then generates the decryption key, and transmits it to the monitor 40. Further, in this case, the monitoring center 70 generates the encryption key for again encrypting the remote monitoring function 342 and transmits it to the monitor 40 together with the decryption key. The monitor 40 receiving the decryption key and the encryption key further transmits the received decryption key and encryption key to the elevator control device 30.

In next step S106, it is judged whether or not the elevator control device 30 receives the decryption key and the encryption key. As a result, in a case where the elevator control device 30 does not receive the decryption key or the encryption key, a process in step S106 is repeatedly executed until the decryption key and the encryption key are received. In step S106, when a positive judgment is recognized, the processing moves to next step S108.

In step S108, the elevator control device 30 decrypts the control program of the remote monitoring function 342 by using the received decryption key. In next step S110, the elevator control device 30 stores the received encryption key in the memory 34. When a process in step S110 ends, the decryption process ends, and the processing moves to the encryption process indicated by step S112 to step S122 of the control routine illustrated in FIG. 6.

In step S112, the elevator control device 30 starts a life timer. The life timer is a timer that sets an effective time of the decrypted remote monitoring function 342. In next step S114, the elevator control device 30 executes the control program of the remote monitoring function 342 and thereby executes the monitoring control process.

In next step S116, the elevator control device 30 judges whether or not the health check response is received. The monitor 40 periodically, for example, one time a day, transmits the health check request to the monitoring center 70. The monitoring center 70 accepting the health check request transmits the health check response to the monitor 40. The monitor 40 receiving the health check response transmits the received health check response to the elevator control device 30.

In step S116, in a case where the elevator control device 30 receives the health check, it can be determined that a communication state between the elevator control device 30 and the monitoring center 70 is normal. In this case, the processing again returns to step S112, and the life timer is again reset and is started from zero (0) as an initial value. This process is also referred to as "initialization process". The initialization process updates the effective time of the decrypted remote monitoring function 342.

On the other hand, in step S116, in a case where the elevator control device 30 does not receive the health check, the processing moves to next step S118. In step S118, it is judged whether the encrypting condition is satisfied. The encrypting condition here is a condition to be satisfied when the life timer expires. The elevator control device 30 judges whether or not a continuous time counted by the life timer reaches a designated time that is in advance designated. Note that the designated time is set to a time at least longer than a transmission interval of the health check request.

In step S118, in a case where the life timer does not expire, it is judged that the encrypting condition is not satisfied, the processing again returns to step S114, and the monitoring control process is continued to be executed. On the other hand, in step S118, in a case where the life timer expires, it can be determined that the health check response to the health check request is not received. Such a situation is possible, for example, in cases such as a case where communication between the monitor 40 and the elevator control device 30 is interrupted due to disconnection or the like between the monitor 40 and the elevator control device 30 and a case where communication between the monitor 40 and the monitoring center 70 is interrupted. In such a case, because it is assumed to be possible that the decrypted remote monitoring function 342 is not properly used, it is judged that the encrypting condition is satisfied, and the processing moves to next step S120.

In step S120, the elevator control device 30 encrypts the control program of the remote monitoring function 342 by using the encryption key stored in the memory 34. In next step S122, the elevator control device 30 deletes the encryption key stored in the memory 34.

In the above decryption process, the remote monitoring function 342 is decrypted by using the decryption key to be obtained from the monitoring center 70. Accordingly, use of remote monitoring function 342 without the monitoring center 70 being involved can be prevented. Further, in the encryption process, in a case where the elevator control device 30 cannot receive the health check transmitted from the monitoring center 70, the encryption key is deleted after the remote monitoring function 342 is encrypted. Accordingly, the remote monitoring function 342 can be prevented from being continuously used in a state where communication with the monitor 40 or the monitoring center 70 is disconnected.

Further, in the encryption process of this embodiment, the remote monitoring function 342 is not deleted from the memory 34. Thus, in a case where communication between the monitoring center 70 and the monitor 40 is blocked for a long time due to power failure or the like, for example, the remote monitoring function 342 is not deleted but is encrypted. Accordingly, in an unintentional stop of the remote monitoring function 342, the remote monitoring function 342 can easily be restored without trouble such as again storing the remote monitoring function 342 in the memory 34.

1-3. Modification Examples of First Embodiment

Forms modified in the following manner may be applied to the elevator monitoring system 100 of the first embodiment.

1-3-1. Monitor 40

In this embodiment, a part or all of functions of the monitor 40 may be arranged in the elevator control device 30. Further, a part of the functions of the elevator control device 30 may be arranged in the monitor 40.

1-3-2. Elevator Control Device 30

Figure 7:
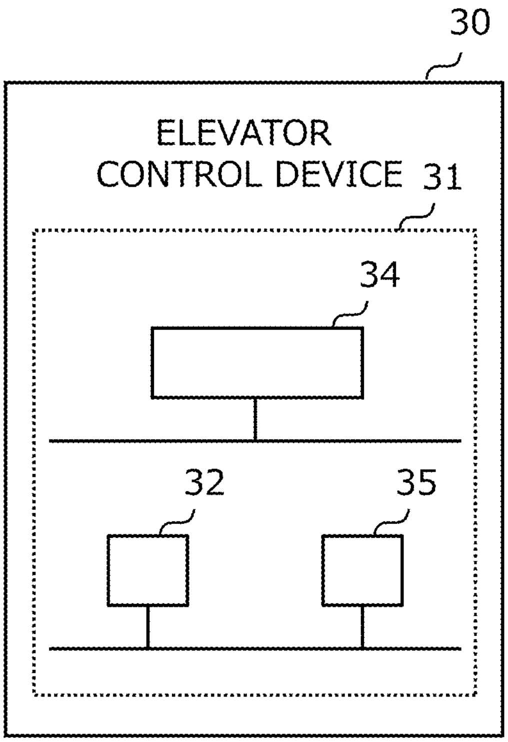
FIG. 7 is a diagram illustrating a modification example of a hardware resource of the elevator control device.

FIG. 7 is a diagram illustrating a modification example of a hardware resource of the elevator control device. In the example illustrated in FIG. 7, the elevator control device 30 includes a processing circuit 31 including the processor 32, the memory 34, and dedicated hardware 35, for example. FIG. 7 illustrates an example where a part of the functions provided to the elevator control device 30 are realized by the dedicated hardware 35. All of the functions provided to the elevator control device 30 may be realized by the dedicated hardware 35. As the dedicated hardware 35, a single circuit, a composite circuit, a processor formed as a program, a processor formed as a parallel program, an ASIC, an FPGA, or a combination thereof can be employed. Note that the above-described modification examples of the elevator control device 30 can also be applied to an elevator monitoring system of a second embodiment described later.

Second Embodiment

2-1. System Configuration of Elevator Monitoring System

An elevator monitoring system of the second embodiment has a similar system configuration to the elevator monitoring system 100 of the first embodiment. As for the system configuration of the elevator monitoring system of the second embodiment, the descriptions about the first embodiment are referred to, and a description thereof will not be made here.

2-2. Characteristics of Elevator Monitoring System of Second Embodiment

Maintenance work by a worker by using the maintenance terminal 60 can preferably be executed in a situation where communication with the monitoring center 70 is disconnected. Accordingly, the control program of the maintenance terminal function 343 that is stored in the memory 34 is not encrypted by the encryption key generated by the monitoring center 70. Thus, the maintenance terminal connector 363 of the input-output interface 36 might be used for another purpose of use than the maintenance contract or might be used after cancellation of the maintenance contract.

Accordingly, in the elevator monitoring system of the second embodiment, the elevator control device 30 counts a continuous connection time in which the maintenance terminal 60 is continuously connected with the maintenance terminal connector 363 of the input-output interface 36. For example, then, in a case where the counted continuous connection time reaches a designated connection time that is in advance designated, the elevator control device 30 executes a communication restriction process for restricting communication with the connected maintenance terminal 60. The designated connection time here is set to a longer time than a connection time that is needed when usual maintenance work is performed while connecting the maintenance terminal 60. Further, as the communication restriction process here, a process for stopping data transmission to and data reception from the maintenance terminal 60 by not responding to a data transmission reception request from the maintenance terminal 60, a process for restricting data transmission to and data reception from the maintenance terminal 60 by intentionally performing a large amount of data transmission to the maintenance terminal 60, and so forth are illustrated as examples.

Further, the elevator control device 30 counts an elapsed time after the communication restriction process is executed. In the following description, this time will be referred to as "restriction time". Further, in a case where a counted restriction time reaches a designated restriction time that is in advance designated, the elevator control device 30 ends the communication restriction process that is being executed.

In the above communication restriction process, inappropriate data communication from the maintenance terminal connector 363 can be restricted. Further, because the communication restriction process ends by a lapse of the designated restriction time, an opportunity for relief can be maintained for a case where the communication restriction process is performed for appropriate use of the maintenance terminal 60.

2-3. Specific Process of Elevator Monitoring System of Second Embodiment

Figure 8:
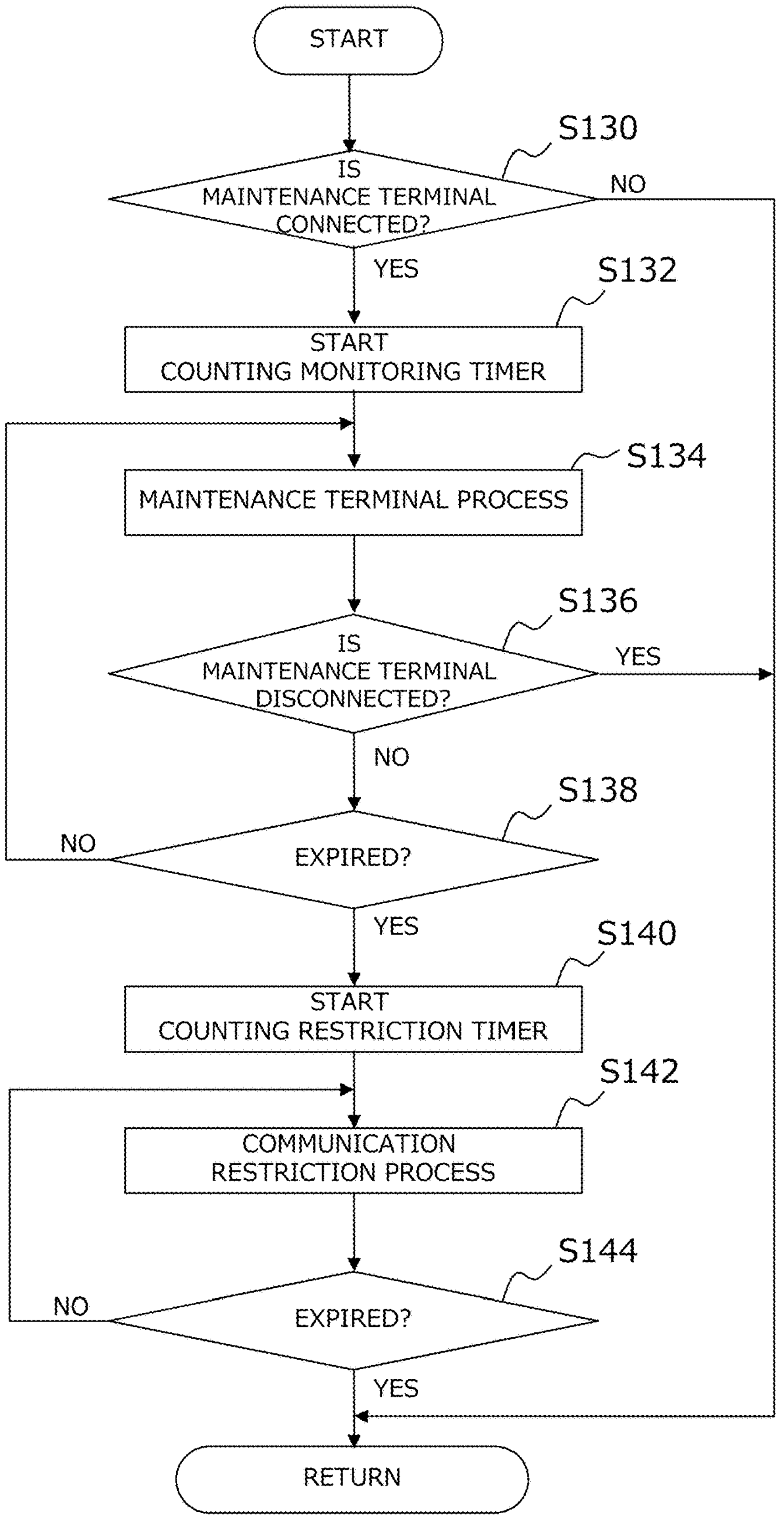
FIG. 8 is a flowchart illustrating a control routine to be executed in an elevator monitoring system in a second embodiment.

FIG. 8 is a flowchart illustrating a control routine to be executed in the elevator monitoring system in the second embodiment. The control routine illustrated in FIG. 8 is repeatedly executed in control cycles that are in advance defined. In step S130 of the control routine illustrated in FIG. 8, the elevator control device 30 judges whether or not the maintenance terminal 60 is connected with the maintenance terminal connector 363 of the input-output interface 36. As a result, in a case where a positive judgment is not made, this routine ends. On the other hand, in a case where the positive judgment is made in step S130, the processing moves to next step S132.

In step S132, the elevator control device 30 starts a monitoring timer. The monitoring timer here is a timer for setting an effective time of a maintenance terminal process using the maintenance terminal function 343. In next step S134, the elevator control device 30 executes the control program of the maintenance terminal function 343 and thereby executes the maintenance terminal process.

In next step S136, the elevator control device 30 judges whether or not the maintenance terminal 60 is disconnected from the maintenance terminal connector 363 of the input-output interface 36. As a result, in a case where a positive judgment is made, this routine ends. On the other hand, in step S136, in a case where the positive judgment is not made, the processing moves to next step S138.

In step S138, the elevator control device 30 judges whether or not the monitoring timer expires. Here, the elevator control device 30 judges whether or not the continuous connection time measured by the monitoring timer reaches the designated connection time. As a result, in a case where the monitoring timer has not yet expired, the processing again returns to step S134, and the maintenance terminal process is executed.

On the other hand, in step S138, in a case where the monitoring timer expires, it can be determined that the maintenance terminal 60 is possibly continuously connected for another purpose of use than maintenance. Such a situation can be considered to be a use form such as a form in which the maintenance terminal 60 is always reading out the monitoring data of the elevator from the maintenance terminal connector 363, for example. In such a case, it is determined that communication with the maintenance terminal 60 needs to be restricted, and the processing moves to next step S140.

In step S140, the elevator control device 30 starts a restriction timer. The restriction timer here is a timer for measuring the restriction time as an elapsed time after the communication restriction process is executed. In next step S142, the communication restriction process is executed. In next step S144, the elevator control device 30 judges whether or not the restriction timer expires. Here, it is judged whether or not the restriction time measured by the restriction timer reaches the designated restriction time. In a case where a positive judgment is not made in step S144, the processing returns to step S142. In other words, the elevator control device 30 repeatedly executes the communication restriction process until the positive judgment is made in step S144. On the other hand, in a case where the positive judgment is made in step S144, the communication restriction process ends, and this routine ends.

The elevator monitoring system configured as described above can prevent the maintenance terminal 60 from performing transmission of data to and reception of data from the maintenance terminal connector 363 exceeding the designated connection time.

REFERENCE SIGNS LIST

10 customer building
20 control target apparatus
30 elevator control device (elevator controller)
31 processing circuit
32 processor
34 memory
35 dedicated hardware
36 input-output interface
40 monitor
60 maintenance terminal
70 monitoring center
72 remote monitoring server
74 memory
76 communication device
80 communication network
100 elevator monitoring system
341 basic communication function
342 remote monitoring function
343 maintenance terminal function
361 elevator mechanism connector
362 monitor connector
363 maintenance terminal connector

The invention claimed is:

1. An elevator control device being connected with a remote monitoring server that remotely monitors an elevator, via a communication network, the elevator control device comprising:

a processor that performs a monitoring control process for monitoring the elevator; and a memory that stores a communication function in which a control program for communicating with the remote monitoring server for the elevator is stored, a remote monitoring function in which a control program for the monitoring control process is stored, and a maintenance terminal function in which a control program for connection with a maintenance terminal is stored, wherein the remote monitoring function is encrypted and is stored in the memory, and the processor is configured to:

receive a decryption key of the remote monitoring function from the remote monitoring server by using the communication function;

decrypt the remote monitoring function by using the decryption key; and execute the monitoring control process, wherein when the decryption key is received from the remote monitoring server by using the communication function, the processor is configured to perform the additional functions of:

receive an encryption key for again encrypting the decrypted remote monitoring function; and store the received encryption key in the memory, and in response to where an encrypting condition that is in advance defined is satisfied, the processor is further configured to:

encrypt the remote monitoring function by using the encryption key; and delete the encryption key, wherein the encrypting condition is a condition that is satisfied where a continuous tune that elapses without a response from the remote monitoring server being received reaches a designated time that is in advance designated.

2. The elevator control device according to claim 1, wherein the response from the remote monitoring server is a response to a health check request that is periodically conducted.

3. The elevator control device according to claim 1, wherein when the remote monitoring function is decrypted by using the decryption key, the processor is further configured to:

start counting the continuous time by a timer, and determine that the encrypting condition is satisfied in a case where the counted continuous time reaches the designated time; and perform an initialization process for resetting the tinier to an initial value in a case where the response from the remote monitoring server is received by using the communication function.

4. An elevator control device being connected with a remote monitoring server that remotely monitors an elevator, via a communication network, the elevator control device comprising:

a processor that performs a monitoring control process for monitoring the elevator; and a memory that stores a communication function in which a control program for communicating with the remote monitoring server for the elevator is stored, a remote monitoring function in which a control program for the monitoring control process is stored, and a maintenance terminal function in which a control program for connection with a maintenance terminal is stored, wherein:

the remote monitoring function is encrypted and is stored in the memory, and the processor is configured to:

receive a decryption key of the remote monitoring function from the remote monitoring server by using the communication function;

decrypt the remote monitoring function by using the decryption key; and execute the monitoring control process, wherein:

the elevator control device includes a maintenance terminal connector for connecting the maintenance terminal, the maintenance terminal function is stored in the memory without being encrypted, and in a case where a continuous connection time in which the maintenance terminal is continuously connected reaches a designated connection time that is in advance designated, the processor is configured to execute a communication restriction process for restricting communication with the maintenance terminal.

5. The elevator control device according to claim 4, wherein the communication restriction process is a process for stopping transmission of data to and reception of data from the maintenance terminal.

6. The elevator control device according to claim 4, wherein in a case where an elapsed time after the communication restriction process is started reaches a designated restriction time that is in advance designated, the processor is configured to end the communication restriction process.

7. The elevator control device according to claim 1, further comprising:

a monitor that performs at least a part of the communication function by being connected with the elevator control device, wherein, the processor is further configured to:

transmit a decryption key request to the remote monitoring server by using the communication function of the monitor; and receive the decryption key, which is generated in response to the decryption key request, from the remote monitoring server.

8. An elevator monitoring system comprising a remote monitoring server that remotely monitors an elevator, and an elevator control device that is connected with the remote monitoring server via a communication network, wherein the elevator control device includes:

a processor that performs a monitoring control process for the elevator; and a memory that stores a communication function in which a control program for communicating with the remote monitoring server for the elevator is stored, a remote monitoring function in which a control program for the monitoring control process is stored, and a maintenance terminal function in which a control program for connection with a maintenance terminal is stored, the remote monitoring function is encrypted and is stored in the memory, the remote monitoring server is configured to transmit a decryption key of the remote monitoring function to the elevator control device in response to a request for the decryption key transmitted from the elevator control device, and the processor is configured to:
receive the decryption key from the remote monitoring server by using the communication function;
decrypt the remote monitoring function by using the decryption key; and
execute the monitoring control process,
wherein:
the remote monitoring server is configured to transmit an encryption key for again encrypting the decrypted remote monitoring function to the elevator control device in response to the request for the decryption key, and
the processor is configured to:
receive the encryption key from the remote monitoring server by using the communication function; and
store the encryption key in the memory,
wherein:
in response to an encrypting condition that is in advance defined is satisfied, the processor is configured to:
encrypt the remote monitoring function by using the encryption key; and
delete the encryption key, and
wherein the encrypting condition is a condition that is satisfied where a continuous time that elapses without a response from the remote monitoring server being received reaches a designated time that is in advance designated.

9. The elevator monitoring system according to claim 8, wherein the response from the remote monitoring server is a response to a health check request that is periodically conducted.

10. The elevator monitoring system according to claim 8,
wherein when the remote monitoring function is decrypted by using the decryption key, the processor is further configured to:
start counting the continuous time by a timer, and determine that the encrypting condition is satisfied in a case where the counted continuous time reaches the designated time; and
perform an initialization process for resetting the timer to an initial value in a case where the response from the remote monitoring server is received by using the communication function.

* * * * *